Nov. 15, 1938.      G. A. HART      2,136,944
TRAVERSOGRAPH
Filed May 14, 1937      2 Sheets-Sheet 1

Nov. 15, 1938. G. A. HART 2,136,944
TRAVERSOGRAPH
Filed May 14, 1937 2 Sheets-Sheet 2
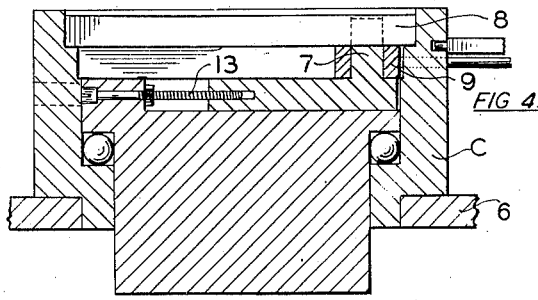
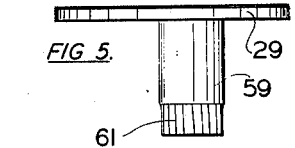
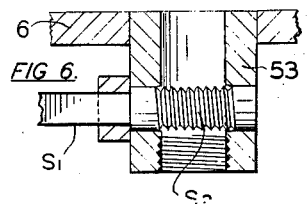
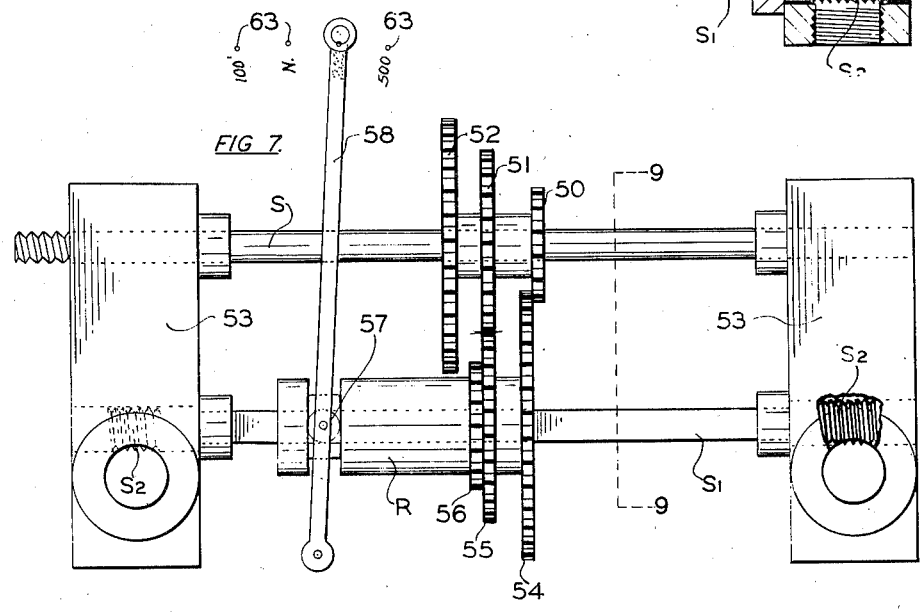
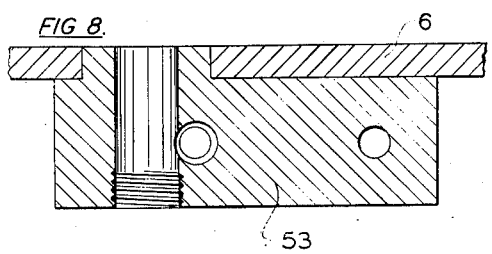
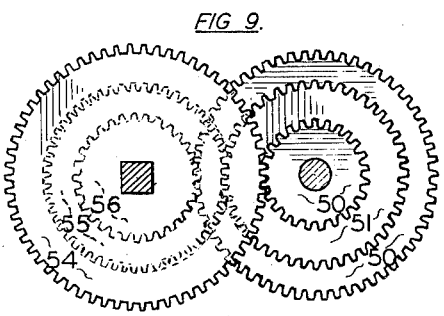

Patented Nov. 15, 1938

2,136,944

UNITED STATES PATENT OFFICE 2,136,944

TRAVERSOGRAPH

Guy A. Hart, Salt Lake City, Utah

Application May 14, 1937, Serial No. 142,579

6 Claims. (Cl. 33—141.5)

My invention relates to a new and efficient device for automatically running a traverse or plotting a route traveled by an automobile or other vehicle.

A further object is to provide a self contained small sized electrically or air driven gyroscope controlled device for plotting a route or drawing upon a receiving drum or chart of the route traversed by the vehicle carrying the device, said vehicle being of any desired type carrying a distance indicator having wheels to which a connection may be made to drive a portion of the device.

A still further object is to provide a simplified economically constructed device which uses a recording stylus or drawing device engaging a rotating drum on which a suitable chart may be mounted, the travel of the vehicle and deviation from its course controlling the movement of the stylus and the rotation of the drum.

These objects I accomplish with the device illustrated in the accompanying drawings in which similar numerals and letters of reference indicate like parts throughout the several views and as described in the specification forming a part of this application and pointed out in the appended claims.

In the drawings in which I have shown my device,

Figure 4 is a sectional view of the central driving disc showing the adjustment feature thereof.

Figure 5 is a side elevation of one of the rotating friction discs.

Figure 6 is a sectional view of the socket or bearing in which Figure 5 operates with the driving worm shown in elevation.

Figure 7 is a plan view enlarged showing the control gearing for driving the rotatable discs.

Figure 8 is a sectional view of the bearing block in which the driving shafts and idling shaft of the gear mechanism is carried.

Figure 9 is an end view of the driving gears sectioning the shafts in Figure 7 on line 9—9.

Figure 1:
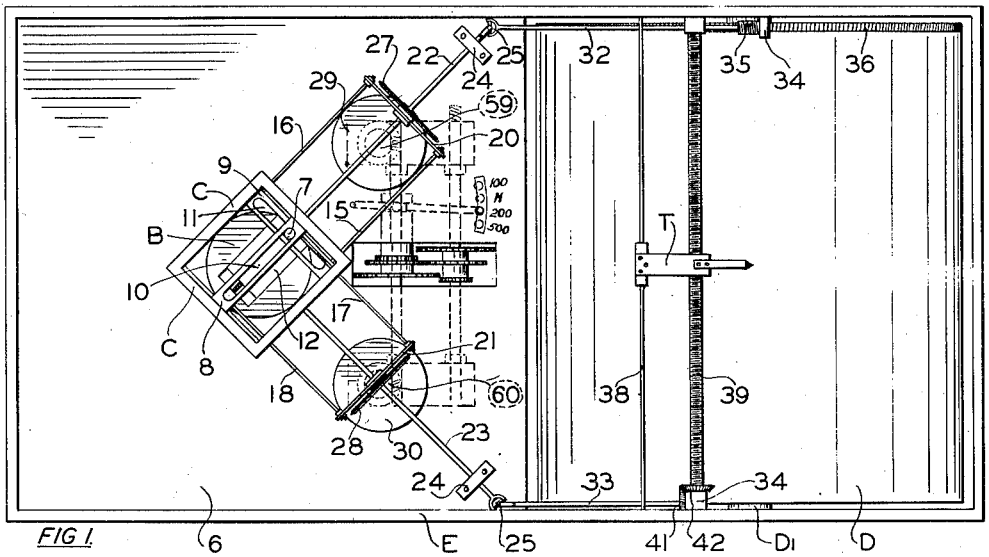
Figure 1 is a plan view of the entire machine, parts shown in dotted lines.
Figure 2:
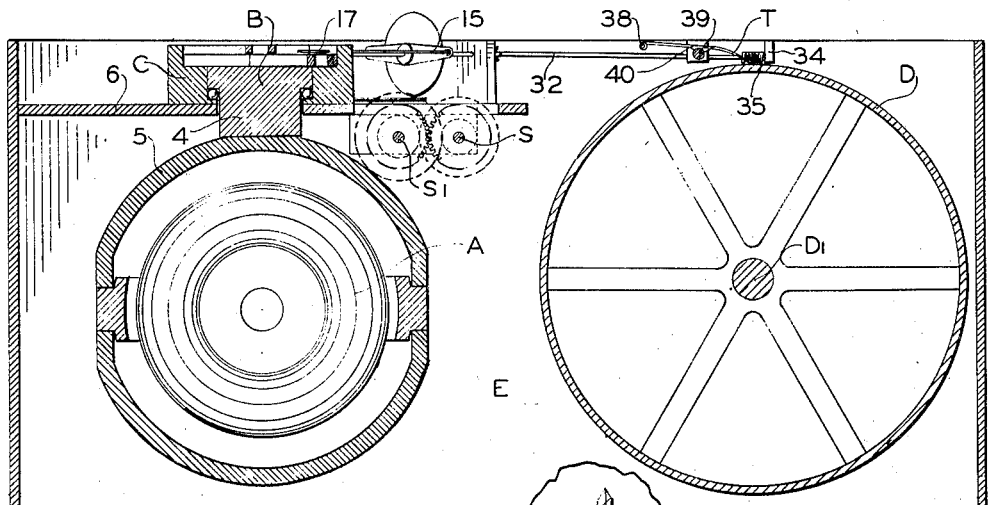
Figure 2 is a vertical section through the center line of the device showing the gyroscope wheel in elevation.
Figure 3:
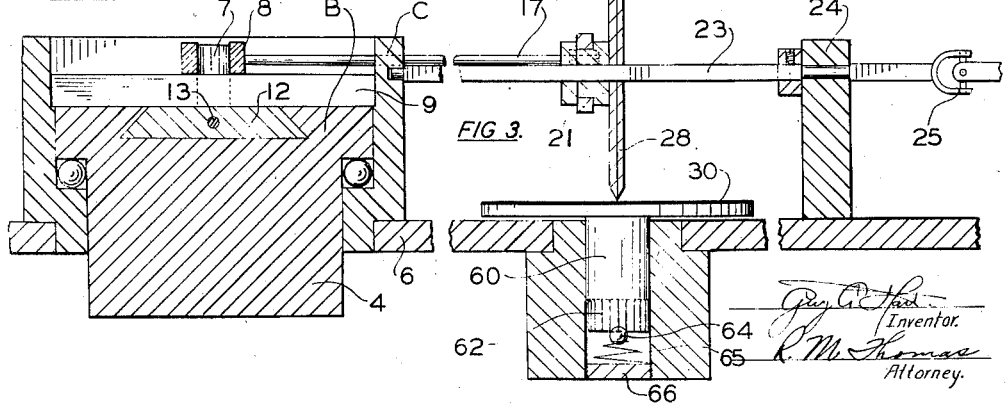
Figure 3 is a section of the driving and controlling elements of the device enlarged over the views shown in Figures 1 and 2.

In the drawings the gyroscope is shown as A, and may be of any of the approved types run by electricity, air, or other suitable sources of energy (not shown). Onto the top of the frame 5 of the gyroscope I mount my rotatable control plate B, with the base 4 secured to and moved by the gyroscope A.

This plate B is provided with a suitable ball bearing support and a platform 6 to eliminate friction and make the plate responsive and eliminate any drag on the action of the gyroscope. Extending above the top of the plate B there is a stub shaft 7 which extends sufficient distance above the plate B to pass through slots in two master control bars 8 and 9. These bars are slotted longitudinally thereof by slots 10 and 11 and the shaft 7 operates therein. Onto the top of this platform 6 surrounding the plate B there is a square box-like framework C in which the bars 8 and 9 operate, said framework C being mounted on the platform at right angles thereto and said framework having a ball race in the bottom end thereof in which the balls for supporting the plate B operate. The framework C is mounted around the plate B and carries the slotted bars 8 and 9 therein one set above the other in positions so that one slotted bar is crossed over and is at an angle of 90 degrees from the other. Across the top of the plate B there is a dovetail slot in which an adjustable dovetailed bar 12 is carried, said bar 12 carrying the stub shaft 7 in one end thereof and carrying a threaded adjustment screw 13 in the opposite end thereof and through one side of the plate B to adjust the position of the stub shaft 7 for correction of the operation of the device. A hole is bored through the side of the framework C for making adjustment of the screw 14.

Onto each end of the bars 8 and 9, I provide guide bars 15 and 16, and 17 and 18 respectively, said bars extending out through spaced holes in the framework C and the ends of the bars are secured to cross plates 20 and 21. These cross plates 20 and 21 carry central bearings medially thereof in which rotatable square rods 22 and 23 are carried. These rods have their outer end mounted in bearings 24 and the extreme end of each rod is formed into a universal joint 25. On each rod 22 and 23 mounted to rotate adjacent the plates 20 and 21 there are vertically mounted friction plates 27 and 28 to transmit the rotation from the rotating plates 29 and 30 to the plates 27 and 28 and thence to the square rods 22 and 23.

The universal joint of the ends of the shafts 22 and 23 drive horizontal shafts 32 and 33. One of said shafts 32 extends along one side of the casing E of the entire device and the shaft 33 along the opposite side and each are supported at the rear end by bearings 34. The shaft 32 carries a worm 35 on the end of the shaft adjacent the bearing, said worm to mesh with and cause the rotation of a large worm wheel 36, said worm wheel 36 being mounted on one end of a rotatable drum D. This drum D carries the plat or sheet on which the traverse is to be recorded, and the stylus or drawing pencil or pen T for recording the traverse is carried above the drum D on a traverse bar 38 and is moved from side to side as the path of the vehicle moves from true center by the rotation of the screw 39 operating a nut 40. The nut 40 is formed attached to the stylus. Thus, any rotation of the screw 39 moves the pen from one side to the other and the rotation of tthe screw is caused by the rotation of the shaft 33 as the shaft 33 is connected to operate the screw through bevel gears 41 and 42.

This combination provides for the rotation of the drum and the positioning of the recording pen or stylus and the power for rotation of these is provided through some source such as a front wheel of the vehicle or in the case of air vehicles by some suitable air motor. This motion is transmitted to a drive shaft S mounted under the platform 6. The drive shaft carries gears 50, 51 and 52 thereon and is held supported by double bearing blocks 53.

Spaced from the shaft S there is a driven shaft S1, said driven shaft being mounted in the other ends of the bearing blocks 53 and said shaft carries a sleeve R on which suitable gears 54, 55 and 56 are formed each being adapted to be brought into meshing contact with its corresponding gears on the shaft S depending upon the size of traverse desired and the amount of reduction required or in other words to make the traverse on any desired scale.

As a shift for the gears the sleeve R is controlled by a shifting roller 57 mounted to a shifting rod 58, said rod being mounted over numerals 63 indicating the reduction position for the gears. The roller 57 operates in an annular groove in the sleeve R. The ends of the bearings 53 in which the shaft S1 is carried are bored to receive vertical and rotatable short shafts 59 and 60, said shafts 59 and 60 carrying rotatable friction plates 29 and 30, respectively.

Each end of the driven shaft S1 is formed into a worm S2 and these worms operate worm wheels 61 and 62 formed on the bottom ends of the shafts 59 and 60, thus the friction plates are rotated by the distance of travel of the vehicle.

As a means of holding tension between the friction plates and the rotatable friction wheels 27 and 28 I provide a ball bearing 64 medially on the bottom end of the shafts 59 and 60 and holding this ball there is a spiral coil spring 65 all held in place by the threaded plate 66 which plate is screwed into the bottom end of the bearing blocks 53.

The operation of the device is as follows:

With the gyroscope running and a sheet of material on the drum D with the machine connected to the front wheel the lever 58 is set for the desired size of map and the car is started.

As the car travels forward any deviation from a true line will through the action of the gyroscope be transmitted to the control plate B which will shift the master control bars 8 and 9 by the action of the shaft 7 and this will change the relative position of the friction wheels 27 and 28 on the plates 29 and 30 and this will change the drive of the drum D and the position of the stylus relative to the amount of deviation from a straight line.

If a right angle turn is made the wheel 27 will be drawn to the center of the plate 29 and there will be no relative motion thus the drum will stop rotating and the stylus will be drawn straight across the drum to show the direction.

Having thus described my invention I desire to secure by Letters Patent and claim:

1. In a device of the class described, the combination of a casing; a drum mounted for rotation in one end thereof and a gyroscope mounted in the other end; means to drive said gyroscope; a control plate mounted through a platform in said casing onto said gyroscope having a stub shaft extending above said plate, said gyroscope to control the rotative action of said plate depending upon the deviation from a true course; a framework mounted around and above said control plate; master control bars mounted in said framework each having a central longitudinal slot therein engaging on said stub shaft; rotatable friction plates mounted in said platform; rods extending from each master control bar out through the sides of the framework to a cross bar at their ends; a square shaft mounted between each pair of said bars and having its free end connected to a universal joint; a vertical friction disc mounted on said square shafts to transmit motion from said friction plates to said square shafts to drive said universal joints; a shaft extending back from each universal joint one carrying a worm on its end to drive said drum; a set of bevel gears mounted on the end of the other rearwardly extended shaft; a screw driven by said gears said screw mounted to rotate on an axis parallel to said drum; a support bar spaced from said screw; and a stylus pen mounted to slide on said bar and be actuated by said screw.

2. In a device of the class described, the combination of a gyroscope having a vertical shaft thereabove; a control plate on the top end of said shaft; a stub shaft mounted in said plate; master control slotted bars mounted above said plate to be moved parallel to said plate by said stub shaft means to adjust the relative radial position of said stub shaft in said plate; means connected with one of said bars to rotate a drum; means to drive a stylus pen from the other of said bars; and means to control the movement of said drum and stylus, depending upon the forward movement of the vehicle in which the device is being carried.

3. In a device of the class described, the combination of a gyroscope; a control plate actuated by said gyroscope; master control bars mounted above said plate and operated thereby; a stub shaft carried in a suitable block in said plate, said shaft extending upwardly through both control bars to move them transversely to said plate rotating friction plates mounted near said control plate; vertical friction wheels mounted to engage said friction plates; means connecting said master control bars with said friction wheels to shift them on said friction plates to vary the speed and rotation thereof; means to drive said friction plates commensurate with the speed of the vehicle in which the device is being used and the direction of travel; and means to imprint a traverse of said travel upon a rotating drum from one of said friction wheels.

4. In a device of the class described, the combination of a gyroscope having a vertical shaft thereabove; a control plate mounted horizontally to be rotated by said shaft; a stub shaft extending up from said plate; means to adjust the radial position of said stub shaft in said plate; master control slotted bars mounted above said plate to be transversely moved across the top of said plate by said stub shaft; a framework mounted around said bars in which they are operated; parallel bars extending from said master control bars to a cross plate; a shaft mounted through each cross plate extending outwardly and carrying a universal joint on the end thereof; a friction driven plate carried on each shaft; friction driving plates mounted horizontally under said friction driven plates; means to drive said plates from the vehicle in which the device is being operated; a drum mounted for rotation driven by one of said extended shafts; a stylus pen mounted over said drum to be driven by the other of said extended shafts the drum and stylus pen to be driven commensurate with and controlled by the position of the gyroscope.

5. In a device of the class described, the combination of a gyroscope having a vertical shaft extending thereabove; a control plate mounted on the top end of said shaft; a stub shaft extending up from said plate; master control slotted bars mounted above said plate to be transversely moved across the top of said plate by said stub shaft extending up through the slots of said bars; rotatable friction plates mounted near said control plate; vertical friction plates engaging said rotatable plates to transmit power therefrom, said plates being controlled in their relative position on said rotatable plates by the position of said slotted bars; means to transmit motion from one of said vertical plates to drive a rotatable drum; means to transmit motion from the other of said vertical plates to actuate a stylus pen; and means to quickly change and control the scale of the imprint on said drum.

6. In a device of the class described, the combination of a gyroscope; a control plate actuated thereby having a stub shaft extending therefrom; master control bars mounted above said plate and laterally movable by said shaft and the rotation of said plate; rotating friction plates mounted near said control plate; means to change the speed of said rotating friction plates; means to drive said plates commensurate with the speed of travel of the vehicle in which the device is being operated; vertically mounted friction plates operating on said rotating friction plates to receive motion therefrom; rods connecting said master control bars with said vertical plates to control the position of the plates on the rotating friction plates depending upon the direction of travel of the vehicle; a rotating drum driven by one of said vertical plates; and a stylus pen driven by the other of said vertical friction plates to imprint the travel of the vehicle on the perimeter of said drum.

GUY A. HART.